United States Patent
Schmidt et al.

(10) Patent No.: US 7,969,045 B2
(45) Date of Patent: Jun. 28, 2011

(54) INSTALLATION

(75) Inventors: Josef Schmidt, Graben-Neudorf (DE);
Martin Habermaas, Mannheim (DE);
Tobias Markheiser, Elsenz (DE);
Leobald Podbielski, Karlsruhe (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 374 days.

(21) Appl. No.: 12/227,920

(22) PCT Filed: May 10, 2007

(86) PCT No.: PCT/EP2007/004122
§ 371 (c)(1),
(2), (4) Date: Dec. 1, 2008

(87) PCT Pub. No.: WO2007/137683
PCT Pub. Date: Dec. 6, 2007

(65) Prior Publication Data
US 2009/0160262 A1    Jun. 25, 2009

(30) Foreign Application Priority Data

May 30, 2006 (DE) .......................... 10 2006 025 457
Mar. 23, 2007 (DE) .......................... 10 2007 014 712

(51) Int. Cl.
*H01F 27/42* (2006.01)
*H01F 37/00* (2006.01)
*H01F 38/00* (2006.01)

(52) U.S. Cl. ...................................................... 307/104
(58) Field of Classification Search .................. 307/104, 307/9.1
See application file for complete search history.

(56) References Cited

U.S. PATENT DOCUMENTS

| 5,500,632 | A | 3/1996 | Halser, III |
| 6,005,304 | A | 12/1999 | Seelig |
| 6,265,791 | B1 | 7/2001 | Eberl et al. |
| 7,880,337 | B2 * | 2/2011 | Farkas .......................... 307/104 |
| 2006/0209487 | A1 | 9/2006 | Schmidt et al. |

FOREIGN PATENT DOCUMENTS

| DE | 24 45 143 | 4/1976 |
| DE | 94 18 594 | 2/1995 |

(Continued)

OTHER PUBLICATIONS

International Bureau, Translation of International Preliminary Report on Patentability (including Written Opinion of the International Searching Authority), International Patent Application No. PCT/EP2007/004122, Jan. 22, 2009.

(Continued)

*Primary Examiner* — Jared J Fureman
*Assistant Examiner* — Carlos Amaya
(74) *Attorney, Agent, or Firm* — Kenyon & Kenyon LLP (57) ABSTRACT

An installation for the non-contact transfer of energy includes at least one primary conductor system and a pick-up, including at least one secondary winding inductively coupled to the primary conductor system, the secondary winding including at least one flat ribbon cable, which has at least two electrical conductors extending in parallel, that are held at a distance from each other and are insulated with respect to each other, the secondary winding being made up of part windings, which in each case are formed from one of the electrical conductors, each of the part windings, together with an associated capacitance, forming a series resonant circuit, whose resonant frequency corresponds substantially to the medium frequency of the primary current.

23 Claims, 6 Drawing Sheets

FOREIGN PATENT DOCUMENTS

| | | |
|---|---|---|
| DE | 44 46 779 | 6/1996 |
| DE | 197 35 685 | 2/1999 |
| DE | 199 29 344 | 12/2000 |
| DE | 103 12 284 | 10/2004 |
| WO | WO 92/17929 | 10/1992 |

OTHER PUBLICATIONS

International Search Report, PCT/EP2007/004122, dated Sep. 19, 2007.

* cited by examiner

INSTALLATION

FIELD OF THE INVENTION

The present invention relates to an installation.

BACKGROUND INFORMATION

DE 44 46 779 and WO 92/17929 describe methods for the non-contact transfer of energy, in which there is an inductively weak coupling.

DE 199 29 344 describes a winding, made up of a plurality of parallel conductors interconnected via connecting elements.

DE 103 12 284 describes a pick-up that includes a secondary coil able to be coupled inductively to a primary conductor.

DE 24 451 143 describes an electric transformer, in which a ribbon cable is used to form at least two windings.

The U.S. Pat. No. 5,500,632 describes a wide-band audio transformer.

SUMMARY

Example embodiments of the present invention provide an installation that may be manufactured with low expenditure.

The installation may be provided as an installation for the non-contact transfer of energy, including at least one primary conductor system and a pick-up, including at least one secondary winding inductively coupled to the primary conductor system, the secondary winding including at least one flat ribbon cable, which has at least two electrical conductors extending in parallel, that are held at a distance from each other and are insulated with respect to each other, the secondary winding including part windings, which in each case are formed from one of the electrical conductors, each of the part windings, together with an associated capacitance, forming a series resonant circuit whose resonant frequency corresponds substantially to the medium frequency of the primary current.

This offers the advantage that a coil winding having many part windings, which are connectable in series, is manufacturable without great expenditure. The reason is that it is only necessary to use the flat ribbon cable to implement the winding. No further expenditure is necessary to produce the part windings. The flat ribbon cable holds a plurality of conductors separate and is able to be manufactured easily and inexpensively by extrusion-coating or extruding. The material of the flat ribbon cable is preferably of plastic. A winding is able to be wound more quickly, since all conductors of the flat ribbon cable are wrapped once simultaneously during a wrapping, thus reducing the expenditure for the winding.

In example embodiments, the coil winding, thus the secondary winding, is made from two or more flat ribbon cables, the flat ribbon cables being disposed in periodic sequence from inside to outside. An advantage in this case is that a great number of part windings are able to be produced with low expenditure. In addition, the adjacent conductors of one flat ribbon cable are axially adjacent to each other. However, the adjacent conductors of two conductors in different flat ribbon cables are able to be provided radially side by side. Therefore, only small voltages occur between adjacent part windings.

In example embodiments, the conductors are litz-wire lines, whose individual stranded wires are insulated with respect to each other. This has the advantage of reducing the skin effect.

In example embodiments, each conductor is provided as a part winding of the total coil winding. This offers the advantage that the conductors are combined in one flat ribbon cable, and therefore the coil winding, including all part windings, may be produced easily and quickly.

In example embodiments, the pick-up is provided for an installation for the non-contact transfer of energy, the housing of the pick-up surrounding a secondary coil together with its core, as well as capacitors for forming a capacitance electrically connected to the coil.

The advantage in this case is that the pick-up is able to be mounted as a unit, and a general dissipation of heat from the components may be provided. In addition, only one housing is needed for all components, and they are able to be configured compactly and insulated. However, a further important advantage is also that the large voltages occurring, particularly in the case of the series resonant circuit, or large currents, particularly in the case of the parallel resonant circuit, are easily controllable, and the necessity of laying long electrical lines between the inductance and the capacitance, which would be painstaking and costly as well as result in increased radiation and losses, is avoided. Furthermore, only one connecting lead, which must transmit the load current and the load voltage, is provided to the load. Higher currents or voltages, which occur only within or because of the parallel or serial resonant circuit, remain spatially within the pick-up. Therefore, the requisite technical arrangements, such as conductor bars for heavy current and/or insulating material for high voltages, are disposed within the pick-up, thus in a spatially tightly-restricted area. Therefore, the arrangement may be implemented compactly. Moreover, the housing of the pick-up is also usable for insulation and as shock-hazard protection. In addition, the wiring, thus, the electrical connections and connecting points, with the exception of the connecting lead, are able to be provided in this spatially tightly-restricted area.

In example embodiments, at least one inductance and capacitance are provided as resonant circuit, particularly as parallel or series resonant circuit, in the pick-up, the resonant frequency corresponding substantially to the medium frequency of the primary current. This offers the advantage that electromagnetic emissions and the expenditure for electrical connections are reducible.

In example embodiments, the housing is assembled from housing parts, especially in a manner that is leak-proof, detachably connectable and/or in high degree of protection. The advantage here is that the pick-up is also usable in a humid or wet environment, or even in a water environment. Even greater water tightness and better mechanical stability may be achieved by the use of potting compound within the pick-up.

In example embodiments, the coil core is constructed from ferrite, in particular is assembled from a plurality of ferrite parts, especially identical ferrite parts. This is advantageous because different coil cores are manufacturable from constantly the same parts. Thus, a whole series of coil cores or, correspondingly, pick-ups is able to be manufactured, in doing which, it only being necessary to stock one or a few types of parts. The high variance thus achievable within such a modular system requires, nevertheless, only a low stock volume and, correspondingly, low expenditure and outlay requirement.

In example embodiments, one, two or more kinds of ferrite parts are used within the housing. The advantage in this case is that a high variance is able to be produced in the modular system, accompanied by low expenditure.

In example embodiments, the pick-up includes an electrical connection to a load which is able to be supplied with energy from the pick-up. This offers the advantage that only a single connecting lead is necessary outward to the load.

Therefore, the connecting means and connections further necessary are able to be provided within the pick-up, and may be protected, insulated and mechanically fixed in position by the potting compound and/or the housing.

In example embodiments, capacitors are disposed on at least one printed circuit board, whose printed circuit traces are electrically connected to the secondary coil. This is advantageous because the connections are able to be produced in an inexpensive and uncomplicated manner.

In example embodiments, the coil winding or coil windings surround the coil core, and ferrite plates are provided on the outer surface of the coil. The advantage here is that the stray field may be reduced, and thus the efficiency may be improved.

In example embodiments, the coil core is U-shaped, C-shaped or E-shaped, especially with limbs of the U, E or C that are widened at their end. This is advantageous because example embodiments of the present invention are usable for various feasible coil cores, and therefore also for various types of configuration of the primary conductors, as shown by way of example in DE 44 46 779 and WO 92/17929. In the case of the first, a go conductor is provided approximately in the middle of the U. In the case of an E-shaped core, a go conductor may be provided in the area of the first two limbs, and a return conductor may be provided in the area of the last two limbs.

In example embodiments, an insulating body is provided between the printed circuit board and the coil core. This has the advantage that a configuration is achievable which is very compact spatially.

In example embodiments, the secondary coil is assembled from part windings which, in each case, together with an associated capacitance, are implemented as a series resonant circuit, the resonant frequency corresponding substantially to the medium frequency of the primary current. The advantage here is that the voltages occurring in the case of the series resonant circuit are reducible in comparison to the implementation of the pick-up with only a single inductance and a single capacitance. Currents may be correspondingly reduced in the case of an analogous construction with a parallel resonant circuit, which is composed of parallel-connected resonant circuits made of respective part windings and associated, suitably-tuned capacitances.

In example embodiments, the pick-up includes a series connection of the series resonant circuits, including the respective part winding and, in each case, associated capacitance. This is advantageous in that the voltages occurring within the pick-up are reducible, and therefore a simpler insulation is feasible.

In example embodiments, the pick-up includes a series connection of the series resonant circuits, including the part winding and, in each case, associated capacitance. This offers the advantage that the voltages occurring in the pick-up, especially at the winding taps, may be kept small.

In example embodiments, the coil winding is in the form of a flat winding. This has the advantage that the pick-up may be particularly compact.

In example embodiments, the housing is implemented as metal, particularly aluminum. This is advantageous in that stray fields or eddy current losses may be kept small. In addition, the spreading of heat is improved, thus, the heat generated by the coil is dispersed more quickly on the housing, and therefore the peak temperature at the housing is reduced. Moreover, the metal improves the screening of magnetic stray fields escaping from the pick-up. Thus, even a mounting of the pick-up on steel is made possible.

In example embodiments, potting compound is provided in the interior of the pick-up. This offers the advantage that electrical insulation, mechanical cohesion, stability against vibrational tendency and the dissipation of heat to the surroundings are able to be improved.

In example embodiments, the lines of the flat ribbon cable of the coil winding are each in the form of litz wires, the individual stranded wires being insulated with respect to each other, in particular, the flat ribbon cable being a flat ribbon cable wound up in a spiral shape or rectangular-spiral shape. This is advantageous because HF litz wires are available inexpensively, and the consequences of the skin effect are reducible. Therefore, high efficiencies are also achievable at frequencies of the AC current between 10 and 100 kHz.

In example embodiments, connected in series to each part winding is an assigned capacitance, to which in turn another part winding is connected in series, the part windings being positioned in spatial proximity, in particular being adjacent. The advantage here is that spatially adjacent part windings exhibit a low voltage difference relative to each other.

Therefore, the demands on insulating clearance between these adjacent part windings are low.

In example embodiments, connected in series to each part winding is an assigned capacitance, to which in turn another part winding is connected in series, the first part winding being assigned to a first flat ribbon cable, and the other part winding being assigned to another flat ribbon cable. This offers the advantage that the two flat ribbon cables are able to be wound up together to form the coil. In addition, each flat ribbon cable has an end and a start. This is advantageous because a plurality of part windings are connectable quickly and easily to a plurality of capacitances, and they in turn are connectable to a plurality of further part windings by running an end of the first and a start of the other flat ribbon cable to a printed circuit board and electrically connecting them. Thus, an extensive series connection of a plurality of inductances and capacitances may be produced easily and quickly.

Among the features with respect to the installation are that a previously described pick-up is provided in a manner allowing travel along an extended primary conductor. This is advantageous in that a particularly compact installation is able to be provided, in which a primary conductor system is able to be supplied from an infeed, and movably disposed loads are able to be fed from the primary conductor system in non-contact fashion via a weak inductive coupling, thus also across a large air gap.

In example embodiments, the pick-up is provided in a manner allowing travel along an extended primary conductor. This is advantageous because energy is transmittable to a movably disposed load, thus, for example, to an electric drive of a vehicle.

In, the primary conductors in the direction of the axis of the coil winding have a distance to the coil core which is less than the distance of two limbs of the coil core to each other. Of advantage is that high efficiency is attainable, even though the primary conductors are disposed in a first plane, e.g., are laid in the base, and the pick-up is movable above this plane, undisturbed.

In example embodiments, one section of the coil core is E-shaped, such that a middle limb and two outer limbs are provided on back parts disposed in one plane, in particular, the direction of the normal of the sectional plane extending in the direction of the extended primary conductors. The advantage here is that the primary conductors are each able to be provided in the area between the outer and middle limb, the primary conductor having a distance from the limbs, however, and the distance between the primary conductor and the part connecting the limbs being greater than each limb length. In the case of an E-shaped coil core, the part is the back part of the E.

Further features and aspects of example embodiments of the present invention are described below with reference to the appended Figures.

LIST OF REFERENCE NUMERALS 1 housing
5 printed circuit board
6 capacitors
7 seal
8 housing plate
10 connecting lead
11 ferrite plate
12 ferrite part
13 ferrite plate
14 ferrite part
15 ferrite plate
20 winding made of litz-wire flat ribbon cable
21 lateral ferrite plates
31 first printed circuit board
32 second printed circuit board
41 flat ribbon cable with associated path inductances of the litz-wire line sections included
42 flat ribbon cable with associated path inductances of the litz-wire line sections included
301 terminal strip
302 terminal strip
303 terminal strip
304 terminal strip
Band 1 flat ribbon cable
Band 2 flat ribbon cable

DETAILED DESCRIPTION

Figure 1A:
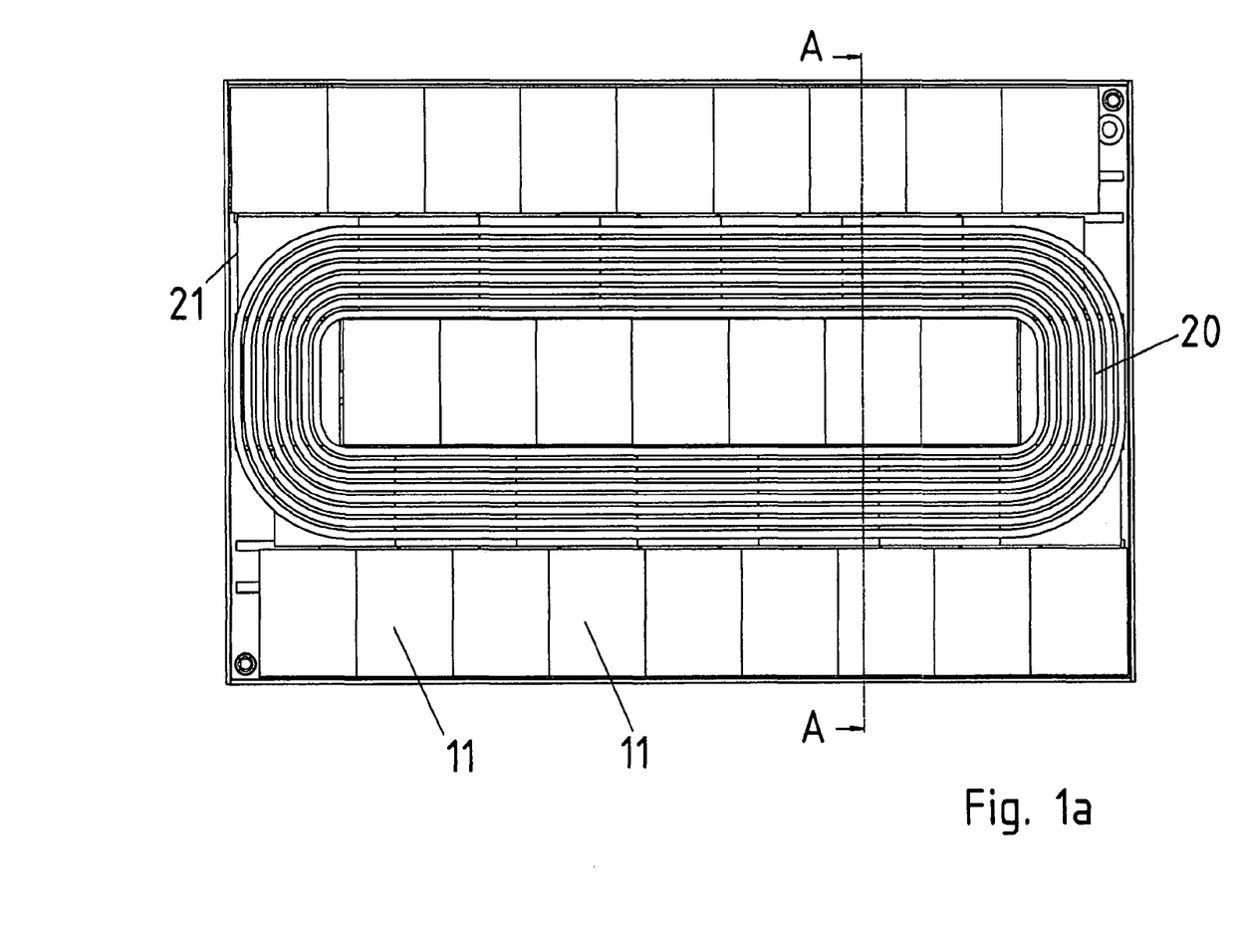
FIG. 1a illustrates a plan view of a device according to example embodiments of the present invention.
Figure 1B:
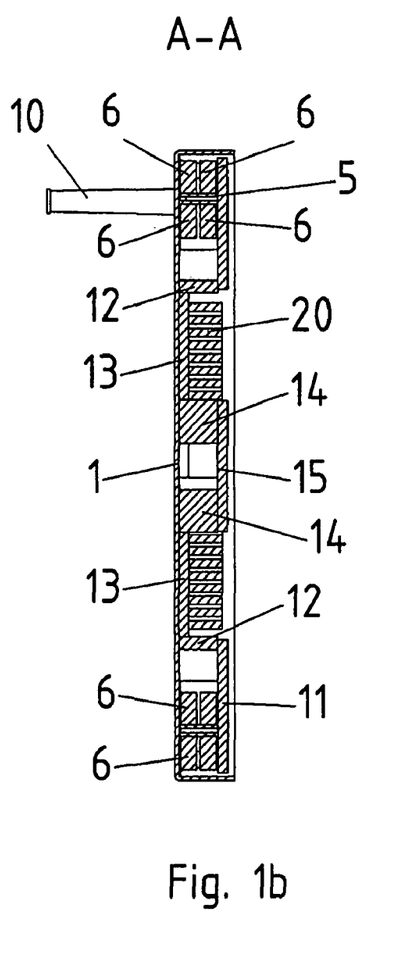
FIG. 1b illustrates a sectional view, along line A-A shown in FIG. 1a, of a device according to example embodiments of the present invention.
Figure 1C:
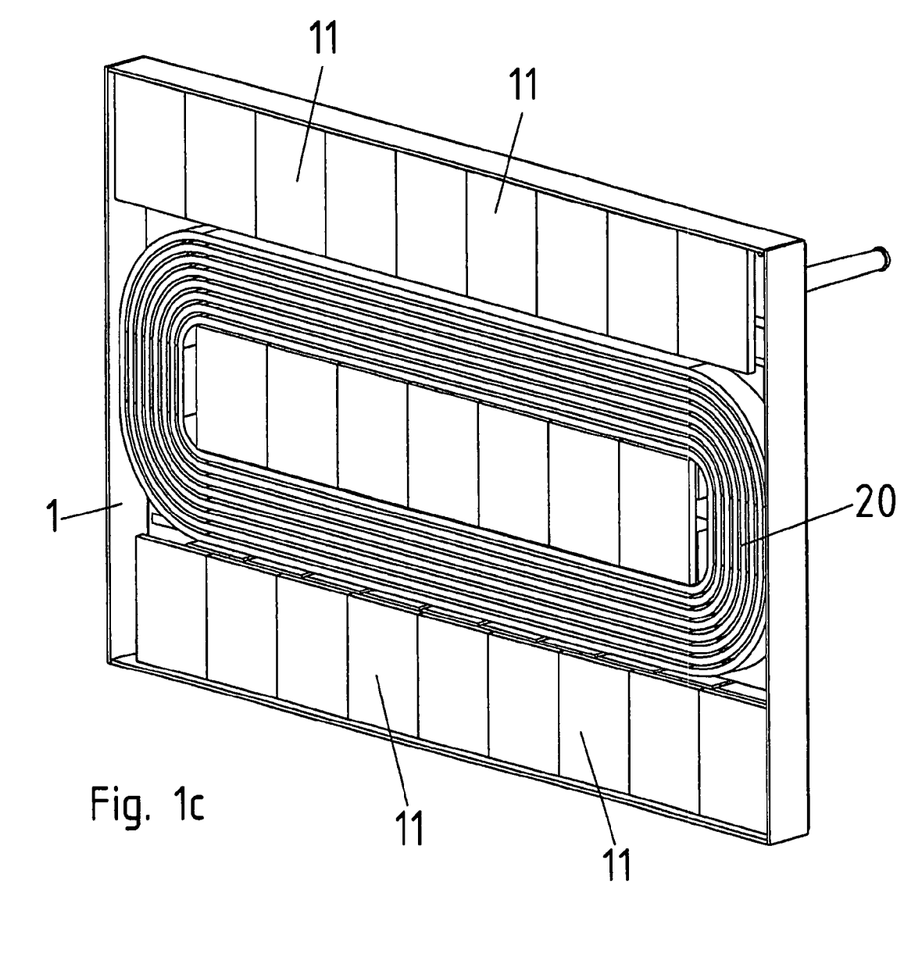
FIG. 1c illustrates an oblique view of a device according to example embodiments of the present invention.
Figure 1D:
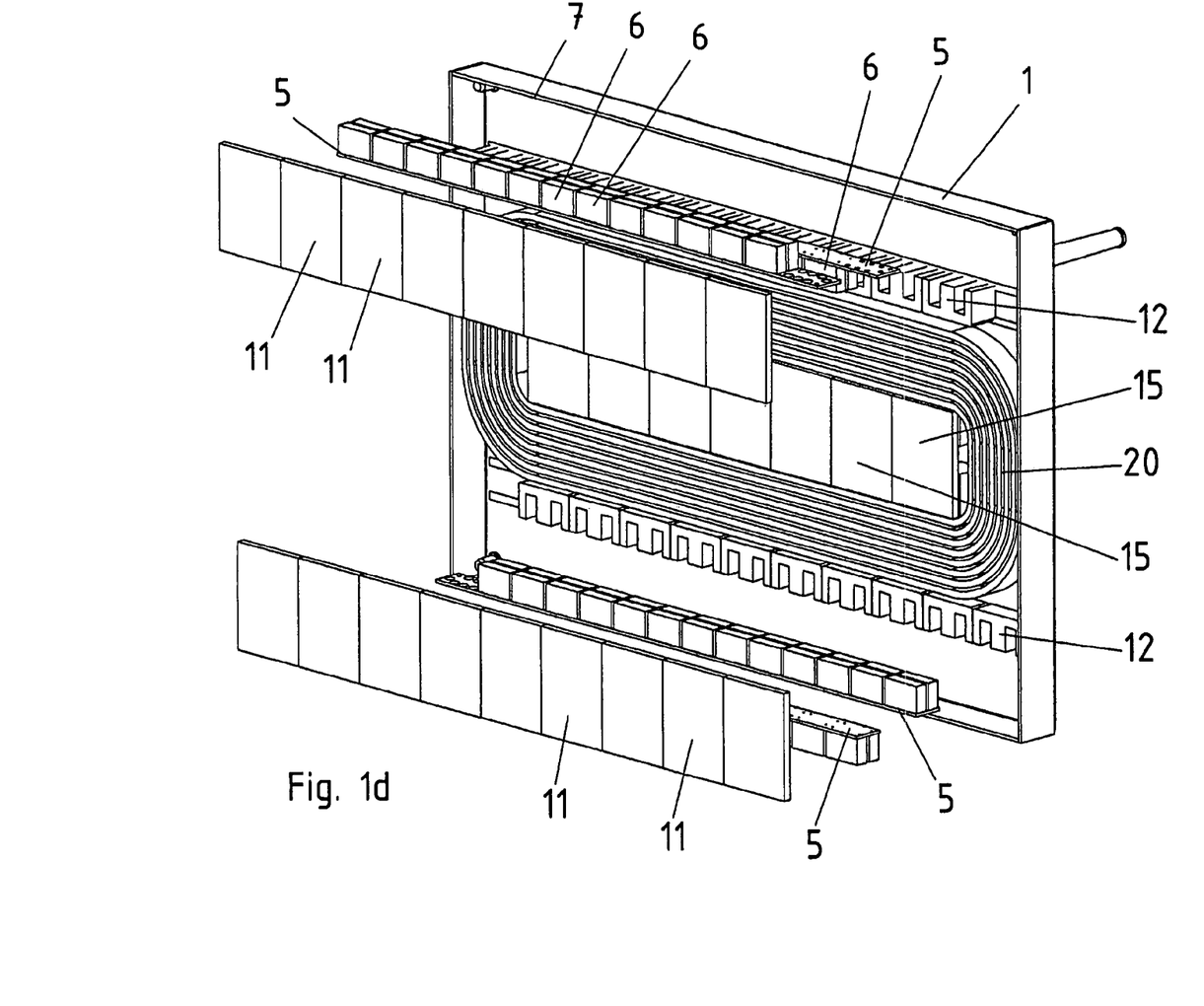
FIG. 1d illustrates an exploded view of a device according to example embodiments of the present invention.

A device according to example embodiments of the present invention is shown in plan view in FIG. 1a, in section in FIG. 1b, in oblique view in FIG. 1c and in exploded view in FIG. 1d.

In concerns what is referred to as a pick-up that, by way of example, is attachable to a load. The load is disposed in a manner allowing movement along a primary conductor, a medium-frequency AC current being injected into the primary conductor by an infeed. The infeed is preferably in the form of a current source.

The associated secondary winding, which is able to be coupled inductively to the primary conductor, is provided in the pick-up. The coupling is weak, thus across a large air gap. However, to nevertheless permit high efficiency in the non-contact transfer of the electric power from the primary conductor system to the secondary winding, a capacitance is connected in series to the secondary winding such that the associated resonant circuit has a resonant frequency which corresponds essentially to the medium frequency.

The pick-up has a housing 1, preferably made of metal such as aluminum. It surrounds the substantially E-shaped coil core and secondary winding 20 surrounding it, which is shown only symbolically. The coil core is assembled from ferrite plates (11, 21) and ferrite parts. The approximate shape of the coil core may be described as an E whose middle limb is not widened. However, the outer two limbs are widened at their end by placing ferrite plates 11 at the end of the limbs. In this context, the outer limbs are constructed from ferrite parts 12. The middle limb is implemented using two ferrite parts 14 and a ferrite plate provided thereon.

At the lateral end of housing 1, ferrite plates 21 are mounted on the inner side, the ferrite plates being provided to reduce stray fields and to further improve efficiency.

The entire configuration of ferrite cores, ferrite parts and winding 20 is provided within housing 1. An insulation, not shown in the figure, is provided between printed circuit boards 5 fitted with capacitors 6. Provided on printed circuit boards 5 are capacitors 6 which form the indicated capacitance that, in each case, is connected in series to the inductance of the secondary coil, i.e., its part windings.

According to the figures, a plurality of printed circuit boards is provided in the interior. In particular, they are situated parallel to each other. It may be provided to in each case dispose two printed circuit boards along two inner sides, the capacitors being positioned facing away from each other.

With the aid of seal 7 and using screws, a housing plate is able to be screwed onto and imperviously joined to housing 1. The interior is encapsulated with potting compound beforehand, whereby heat conduction and insulation may be improved.

A lead-through for connecting lead 10 is provided on housing 1, as well. A load such as an electric motor or electronic circuit is thereby able to be fed.

The coil core, E-shaped in section, is made up of a plurality of small ferrite plates and ferrite parts. It is thus possible to manufacture various geometrical dimensions and shapes easily, cost-effectively and quickly.

In further exemplary embodiments, the capacitance is implemented in parallel instead of in series to the inductance of the secondary coil.

The winding is produced from HF-litz wire, thus from litz wire whose mutually-contacting, individual wires are electrically insulated with respect to each other, e.g., by applying an enamel. Losses are thus reduced.

In addition, the litz wire is implemented as a flat ribbon cable. A high efficiency is thereby achievable in a compact space area.

In FIGS. 1a to 1d, winding 20 is drawn in only symbolically. In example embodiments of the present invention, winding 20 is in the form of a flat winding, thus a planar, concentric winding. Overall, therefore, winding 20 is arranged in a rectangular-spiral shape or oval-spiral shape. That is to say, the flat ribbon cable is wound in approximately a rectangular shape or oval shape in one plane. The space required is therefore reduced.

The flat ribbon cable of winding 20 includes a plurality of conductors provided parallel to each other and electrically insulated from each other. The carrier material of the flat ribbon cable holds the conductors at a constant distance relative to each other.

Viewed on the whole, therefore, the flat ribbon cable is wound up as a spiral. The ends of the electrical conductors included are run to a terminal strip. The electrical interconnection of the conductors may be seen in FIG. 2.

The aluminum housing reduces losses, and thus improves the efficiency of the installation.

The primary conductor system includes at least one elongated go conductor and return conductor that belong to a closed loop of the primary conductor system. Both lie outside of the pick-up, thus, in particular, outside of the E-shaped coil core. The two conductors are laid in the direction of the longer side of the rectangular pick-up according to FIG. 1a. The pick-up is guided with a certain distance in the line direction along these conductors. The pick-up is assigned to a rail-guided carriage or to a carriage without rail guidance. In the latter case, it may be provided to equip the carriage with a guidance antenna capable of guiding the carriage in the line direction.

Viewed in plan view, thus in the viewing direction according to FIG. 1a, the go conductor is provided between the middle limb and one outer limb of the E-shaped coil core. The return conductor is provided between the middle limb and the other outer limb of the E-shaped coil core. As mentioned above, however, in the viewing direction, a distance is provided between the coil core and the go conductor and return conductor. However, this distance is smaller than the limb spacing, thus, the distance from the middle to the outer limb of the E.

In further exemplary embodiments according to the present invention, winding 20 of the secondary coil is made up of part windings (41, 42), a capacitance being connected in series to each part winding (41, 42) to reduce the peak voltage occurring at the secondary-coil terminals, thus, in connecting lead 10, as well. Therefore, the secondary current flows via first part winding 41, and then into the allocated first capacitance. After that, it flows via second part winding 42, and then into the allocated second capacitance. This is continued up to the last capacitance. Each inductance and the assigned capacitance are dimensioned such that the associated resonant frequency corresponds substantially to the medium frequency. The printed circuit boards are particularly well-suited to realize the connections between the part windings and the capacitors in a simple and cost-effective manner. At the same time, each part winding is a flat winding.

In further exemplary embodiments according to the present invention, one of the capacitances or the capacitance is realized by series connection and/or parallel connection of a plurality of capacitors.

In other exemplary embodiments according to the present invention, instead of the substantially E-shaped coil core, a U-shaped or a C-shaped or a differently shaped ferrite core may be used, as well.

Figure 2:
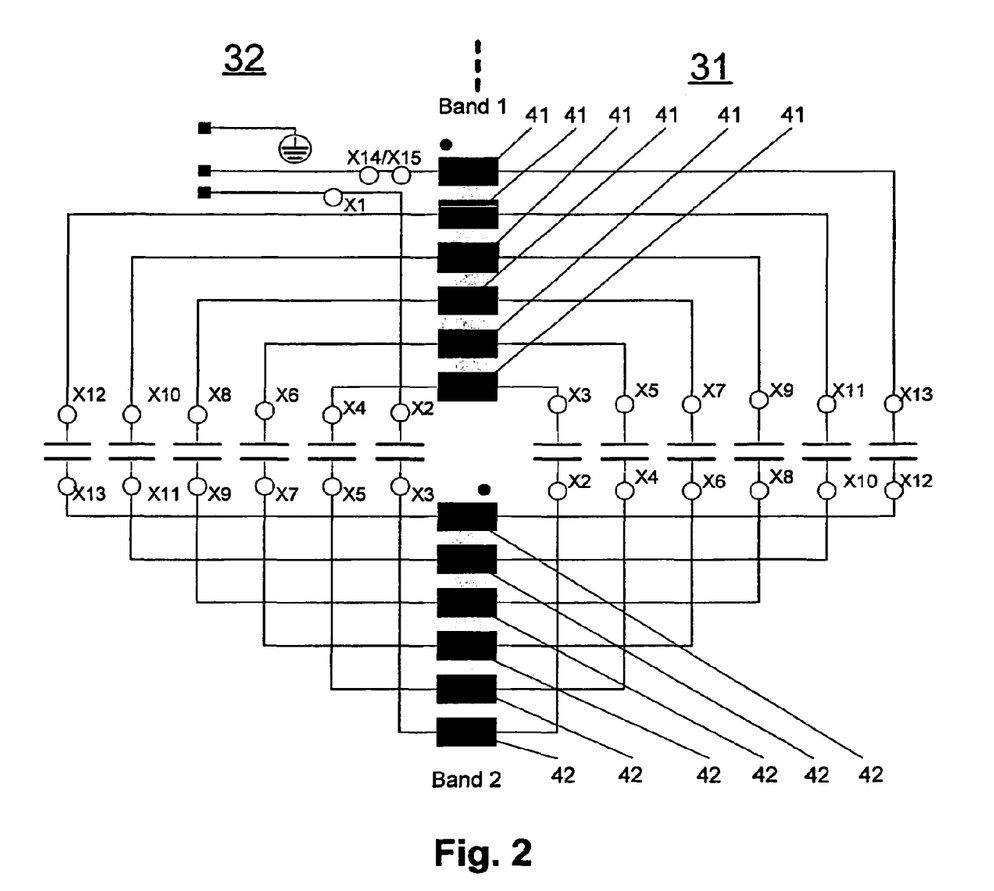
FIG. 2 illustrates a schematic view of the electrical interconnection of conductors of a device according to example embodiments of the present invention.

In FIG. 2, the path inductances of part windings (41, 42) are shown as symbolic representation of part windings (41, 42), and are denoted by corresponding reference numerals (41, 42).

Secondary winding 20 is produced from a flat ribbon cable, the flat ribbon cable including six side-by-side litz-wire lines, which may be referred to as part windings (41, 42). In particular, the litz-wire lines are provided and held parallel to each other in the flat ribbon cable such that the distance in the transverse direction with respect to the line direction is constant relative to each other. In this context, the retention is accomplished by an insulating plastic that, for example, is producible with the aid of extrusion or extrusion coating surrounding the litz-wire lines. In addition, the flat ribbon cable (ribbon 1 of FIG. 2) together with a further flat ribbon cable (ribbon 2 of FIG. 2), that likewise includes six litz-wire lines placed side by side, are wound together. The two flat ribbon cables (ribbon 1, ribbon 2) are thus, as it were, stacked on one another such that after the winding, the two flat ribbon cables are provided in alternating sequence from inside to outside. The flat ribbon cable (ribbon 1 of FIG. 2) includes conductors 41 as part windings. The flat ribbon cable (ribbon 2 of FIG. 2) includes conductors 42 as part windings.

As sketched to illustrate this in FIG. 2, each litz-wire line in each flat ribbon cable (ribbon 1, ribbon 2 of FIG. 2) is provided for one part winding (41, 42), the respective litz-wire line with its associated path inductance being represented symbolically in FIG. 2. As mentioned above, in each case a capacitance is connected in series between the inductance of each part winding (41, 42). Thus, a resonant circuit is able to be built up from capacitors and litz-wire lines without additional inductances having to be provided. Above the capacitors in FIG. 2, the flat ribbon cable is thus indicated as ribbon 1 with the aid of its litz-wire line section inductances 41; below, the flat ribbon cable is indicated as ribbon 2 with the aid of its litz-wire line section inductances 42.

A capacitor is connected in series to a first part winding 41 realized with a first litz-wire line in the first flat ribbon cable (ribbon 1 of FIG. 2)—represented by the litz-wire line sections with associated path inductances 41—the capacitor being followed by a first part winding 42 realized with a first litz-wire line in the second flat ribbon cable. Connected in series to the capacitance series-connected to this part winding is the second part winding, which is realized with the second litz-wire line, in the first flat ribbon cable (ribbon 2 in FIG. 2). Connected in series to the following capacitance is then, in turn, the second part winding, which is realized with the second litz-wire line, in the second flat ribbon cable (ribbon 2 in FIG. 2). This is continued in this manner. In so doing, the sequence of litz-wire lines is selected and arranged such that the successive part windings are spatially adjacent. The voltage differences are therefore reduced. In addition, coil windings in which many part windings are provided may be realized without expenditure.

A further advantage of the type of winding according to FIG. 2 is that a first end of the first flat ribbon cable (ribbon 1 in FIG. 2) is electrically connectable to printed circuit traces on a first printed circuit board 31. A first end of the second flat ribbon cable (ribbon 2 in FIG. 2) is connectable on the same printed circuit board 31. Therefore, a first set of capacitors is connectable between the respective ends.

In analogous manner, the two other ends of the two flat ribbon cables (ribbon 1 and ribbon 2 in FIG. 2) are connected on a second printed circuit board 32 with a second set of capacitors.

Overall, therefore, the flat ribbon cable is wound as a flat winding. Consequently, the conductors held together in the flat ribbon cable lie in parallel one upon the other, the width of the winding in this direction being determined substantially by the width of the flat ribbon cable.

Figure 3:
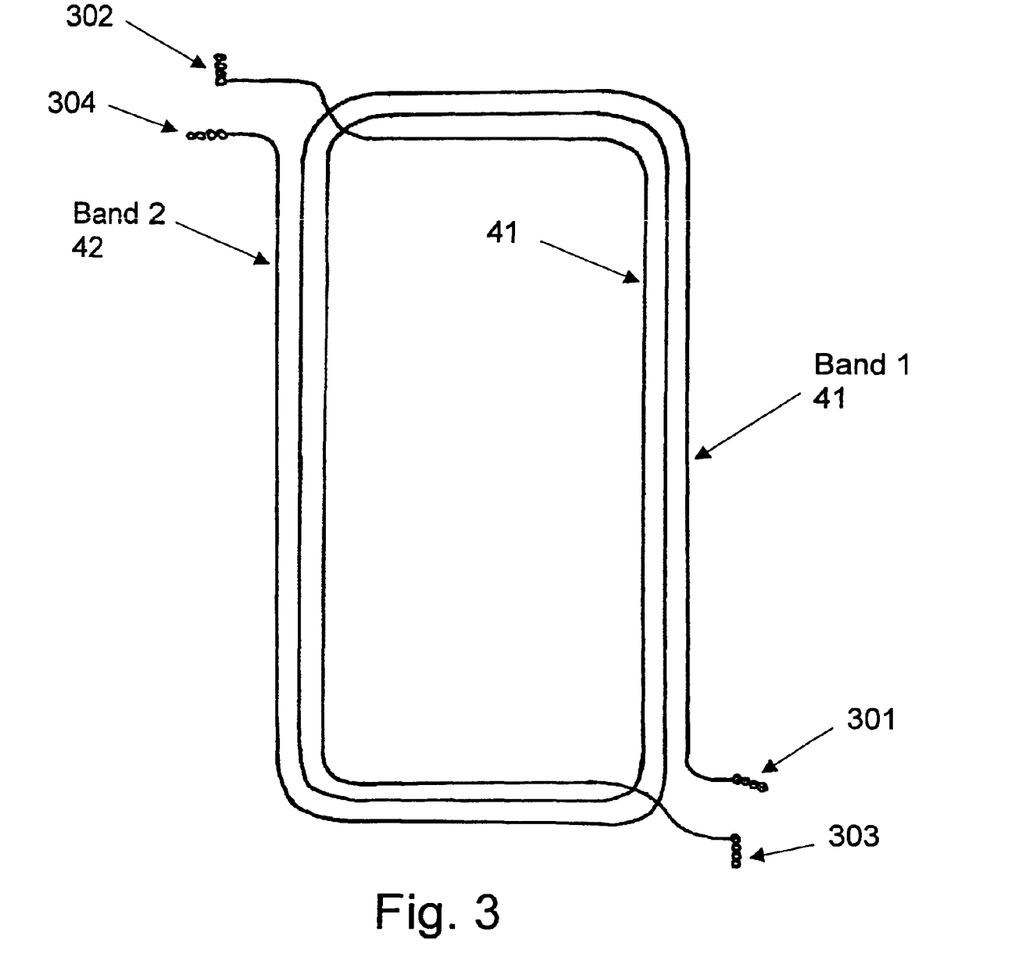
FIG. 3 illustrates a schematic view of a winding having an exemplary number of turns per unit length of 3;2 of a device according to example embodiments of the present invention.

Winding 20 shown only symbolically in FIGS. 1a to 1d, and winding 20 represented only in terms of circuit engineering with inductances in FIG. 2, is clarified more precisely in FIG. 3 for an exemplary number of turns per unit length of 3/2.

The ends of parallel conductors 41 of the flat ribbon cable, ribbon 1, are connected at their respective first end to a terminal strip 301, and at their other end to a terminal strip 302. The terminal strip includes connection terminals for each conductor of the respective flat ribbon cable, so that this respective conductor is connected to a capacitance assigned to it. In the same manner, the ends of the conductors of the flat ribbon cable, ribbon 2, are connected to terminal strips 303 and 304.

Terminal strips 301 and 303 are assigned to first printed circuit board 31 and are provided on it.

Terminal strips 302 and 304 are assigned to second printed circuit board 32 and are provided on it.

In further exemplary embodiments according to the present invention, other numbers of turns per unit length instead of 3/2 have come to light, particularly 11/2, 13/2, or even 15/2. This especially holds true for primary-conductor currents between 10 and 100 ampere, and a maximum power between 300 W and 3 kW to be tapped off from the winding.

What is claimed is:

1. An installation for non-contact transfer of energy, comprising:
at least one primary conductor system; and
a pick-up including at least one secondary winding inductively coupled to the primary conductor system;
wherein the secondary winding includes at least one flat ribbon cable having at least two electrical conductors extending in parallel, held at a distance from each other, and insulated with respect to each other, the secondary winding including part windings, each formed from one of the electrical conductors, each part winding, together with an associated capacitor, forming a series resonant circuit having a resonant frequency that substantially corresponds to a medium frequency of a primary current.

2. The installation according to claim 1, wherein the series resonant circuits are provided as a series connection corresponding to the pick-up.

3. The installation according to claim 1, wherein the secondary winding includes at least two flat ribbon cables alternating in periodic sequence from inside to outside.

4. The installation according to claim 1, wherein the electrical conductors include litz-wire lines having individual stranded wires insulated with respect to each other.

5. The installation according to claim 1, wherein the secondary winding, together with a coil core as well as the capacitors for forming a capacitance connected electrically to the secondary winding, are surrounded by a housing.

6. The installation according to claim 5, wherein the housing includes housing parts.

7. The installation according to claim 5, wherein the housing includes housing parts and at least one of (a) is leak-proof, (b) is detachably connectable, and (c) provides a high degree of protection.

8. The installation according to claim 5, wherein the coil core at least one of (a) is formed of ferrite, (b) is assembled from a plurality of ferrite parts, and (c) is assembled from a plurality of identical ferrite parts.

9. The installation according to claim 8, wherein at least one of (a) the coil core includes at least one kind of ferrite part and (b) the coil core includes ferrite parts adhesively joined together.

10. The installation according to claim 5, wherein the secondary winding surrounds the coil core, and ferrite plates adapted to reduce a stray field are provided at an outer surface of the secondary winding.

11. The installation according to claim 5, wherein the coil core is at least one of (a) U-shaped, (b) C-shaped, and (c) E-shaped.

12. The installation according to claim 5, wherein the coil core is at least one of (a) U-shaped, (b) C-shaped, and (c) E-shaped, ends of limbs of the coil core being widened.

13. The installation according to claim 5, wherein insulating bodies are provided at least one of (a) between printed circuit boards and (b) between printed circuit boards and the coil core.

14. The installation according to claim 5, wherein the housing is formed of at least one of (a) a metal and (b) aluminum.

15. The installation according to claim 5, wherein a potting compound is provided in an interior of the housing.

16. The installation according to claim 1, wherein the pick-up includes an electrical connection to a load that is suppliable with energy from the pick-up.

17. The installation according to claim 1, wherein the capacitors are disposed on at least one printed circuit board having printed circuit traces electrically connected to the secondary winding.

18. The installation according to claim 1, wherein the ribbon cable is wound up in at least one of (a) a spiral shape and (b) a rectangular-spiral shape.

19. The installation according to claim 1, wherein to each capacitor assigned to a first part winding, another part winding is connected in series, the part windings being disposed at least one of (a) in spatial proximity and (b) adjacent to each other.

20. The installation according to claim 1, wherein to each capacitance assigned to a first part winding, another part winding is connected in series, the first part winding being assigned to a first flat ribbon cable and the other part winding being assigned to another flat ribbon cable.

21. The installation according to claim 20, wherein the primary conductors in a direction of an axis of the secondary winding have a distance to a coil core that is smaller than a distance of two limbs of the coil core to each other.

22. The installation according to claim 20, wherein a section of a coil core is E-shaped, such that a middle limb and two outer limbs are provided on back parts disposed in at least one of (a) one plane and (b) a direction of a normal of a sectional plane of the coil core extending in a direction of extended primary conductors.

23. The installation according to claim 1, wherein the pick-up is arranged to allow travel along at least one of (a) an extended primary conductor, (b) a go conductor, and (c) and return conductor.

* * * * *